(12) United States Patent
van der Lugt et al.

(10) Patent No.: US 6,284,190 B1
(45) Date of Patent: Sep. 4, 2001

(54) APPARATUS FOR RECOVERING METAL FROM DROSS

(76) Inventors: Nicholas Stuart van der Lugt, 6 Kingscroft Court, Ridgway, Havant, Hamshire PO9 1LS; John Willmore, 4 Seymore Close, Calmore, Totton, Southampton, Hampshire SO40 2TW, both of (GB)

(*) Notice: Subject to any disclaimer, the term of this patent is extended or adjusted under 35 U.S.C. 154(b) by 0 days.

(21) Appl. No.: 09/438,740

(22) Filed: Nov. 11, 1999

(30) Foreign Application Priority Data

Jan. 26, 1999 (GB) .................................................. 9901540
Nov. 4, 1999 (GB) .................................................. 9926044

(51) Int. Cl.$^7$ ...................................................... C22B 7/04
(52) U.S. Cl. ............................................ 266/227; 420/590
(58) Field of Search ............................. 266/227; 75/414, 75/655, 672, 693, 690; 420/590

(56) References Cited

U.S. PATENT DOCUMENTS

| Re. 31,028 | 9/1982 | Cromwell | 241/14 |
|---|---|---|---|
| 1,615,009 | * 1/1927 | Frost | 75/672 |
| 3,198,505 | * 8/1965 | Amdur et al. | |
| 3,902,894 | 9/1975 | Menendez et al. | 75/86 |
| 4,003,559 | 1/1977 | Kuwano et al. | 266/204 |
| 4,119,136 | 10/1978 | Gancarz, Sr. | 164/121 |
| 4,121,810 | 10/1978 | Lui et al. | 266/201 |
| 4,334,664 | 6/1982 | Gancarz, Sr. | 249/108 |
| 4,386,956 | 6/1983 | Roth et al. | 75/24 |
| 4,394,978 | 7/1983 | Weiss | 241/23 |
| 4,540,163 | 9/1985 | Van Linden et al. | 266/201 |
| 4,565,572 | 1/1986 | Van Linden et al. | 75/24 |
| 4,637,591 | 1/1987 | McMahon et al. | 266/165 |
| 4,772,320 | 9/1988 | Van Linden et al. | 75/68 |
| 5,755,889 | 5/1998 | Johnson | 75/414 |

FOREIGN PATENT DOCUMENTS

| 1507894A | 9/1966 | (DE) . |
|---|---|---|
| 0232221 | 1/1987 | (EP) . |
| 0232221 A1 | 1/1987 | (EP) . |
| 678484 | 8/1950 | (GB) . |
| 2265386 | 9/1993 | (GB) . |
| 52-032601 | 8/1977 | (JP) . |
| 61-026762 | 2/1986 | (JP) . |
| 1312040 | 12/1989 | (JP) . |
| 9-087764 | 3/1997 | (JP) . |
| 10-163617 | 6/1998 | (JP) . |
| WO82/01895 | 6/1982 | (WO) . |
| WO84/03719 | 9/1984 | (WO) . |
| WO95/25823 | 9/1995 | (WO) . |

* cited by examiner

*Primary Examiner*—Melvyn Andrews
(74) *Attorney, Agent, or Firm*—Sheridan Rose P.C.

(57) ABSTRACT

An apparatus and method are described for recovering metal from dross. The apparatus comprises a chamber having an opening to receive the dross and an agitating member mounted in the chamber. The agitating member is driven so that it agitates the dross in the chamber so as to release the metal from the oxide of the dross. The chamber also has an outlet through which the recovered metal and residual oxide are discharged.

12 Claims, 4 Drawing Sheets

APPARATUS FOR RECOVERING METAL FROM DROSS

BACKGROUND TO THE INVENTION

1. Field of the Invention

This invention relates to the recovery of metal from dross.

2. Description of the Prior Art

It is well known that when many molten metals are in contact with the atmosphere, compounds of those metals, primarily oxides, are formed. Especially when there is some movement of the molten metal, the metal and the metal oxide combine to form a material known as dross. Dross consists of droplets of the molten metal which are encrusted with the oxide which forms a sponge-like network. The dross of lead-tin solder, for example, appears like rather fibrous demerara sugar. The dross floats, due to surface tension and/or buoyancy, on the molten metal or sticks to the container holding the metal.

In many industrial processes where dross is formed, it is necessary to remove the dross from time to time. For example, in a wave soldering machine, solder in a bath is pumped to create a static wave in the surface of the solder, and printed circuit boards are fed across the crest of the wave so that the solder kisses the leads of the components and the tracks of the circuit board. If the dross is allowed to build up, it can become entrained in the wave and adversely affect the quality of the soldering, causing low product yields.

The dross could simply be ladled out from the molten metal and disposed of. However, the metal content of the dross can be high and typically, according to one estimate, is in the range of 30 to 90%. The cost of disposing of the raw dross and replacing it with "clean" metal can be a significant.

Attempts have been made in the past to recover the metal content of the dross. For example, patent documents U.S. Pat. No. 4,119,136 and U.S. Pat. No. 4,334,664 describe the recovery of tin from tin dross by draining the tin out at high temperature. The recovery of aluminium from aluminium dross is described in, for example: U.S. Pat. No. 4,772,320 (squeezing hot dross between rollers under pressure); U.S. Pat. No. Re. 31,028 (rolling and milling of cold dross); U.S. Pat. No. 4,394,978 (grinding and screening of cold dross); and U.S. Pat. No. 4,386,956, U.S. Pat. No. 4,540,163, U.S. Pat. No. 4,565,572, WO-A-82/01,895 and WO-A-84/03,719 (squeezing of hot dross between a ram or piston and a trough or cylinder). The recovery of lead-tin alloy from solder dross is described in WO-A-95/25,823, and this also involves squeezing the hot dross with a piston in a cylinder. These latter "hot-squeeze" techniques require the use of a large and substantial machine in order to apply the required pressure, and this in itself is expensive. In existing soldering production lines, there is often not much spare space near the soldering bath, and therefore it may be necessary to site such a large machine away from the soldering bath, as a result of which the dross needs to be reheated before it can be squeezed. Also, the hot-squeeze machines, as exemplified by WO-A-95/25,823, operate on an essentially five-phase cycle: (1) adding the dross to the machine; (2) raising the dross to the required temperature; (3) squeezing the dross; (4) allowing the metal to drain from the dross; and (5) removing the oxide. (Also, it may periodically be necessary to clean a grille or sieve through which the recovered metal or oxide passes.) Accordingly, dross cannot be added to the machine as and when required, only during phase "1" of the cycle.

OBJECT AND SUMMARY OF THE INVENTION

The aims of the present invention, or at least of some specific embodiments of it, are: to enable the recovery of a large or significant proportion of the metal from the dross; to do so without requiring the exertion of high pressures and therefore obviating the need for a large and substantial machine so that there is greater flexibility in the siting of the machine near the source of the dross; and to enable dross to be added as and when required, without needing to wait for a particular phase of operation (subject, of course, to the machine not becoming overloaded).

In accordance with a first aspect of the present invention, there is provided an apparatus for recovering metal from dross, the apparatus comprising: a chamber, means to allow dross to be placed in the chamber, an agitating member mounted in the chamber, means for driving the agitating member so that it agitates the dross in the chamber so as to release the metal from the oxide of the dross, and means to allow the released metal and the oxide to be removed from the chamber.

It has been found that agitating the dross is effective in separating the metal from the oxide. It would appear that it breaks down the sponge-like network of the oxide which encrusts the metal by "knocking it about a lot", rather than by crushing or squeezing it, as in the prior art.

In order to increase the effectiveness of the apparatus, there is preferably a plurality of such agitating members each arranged to be driven by the driving means.

For mechanical simplicity, the driving means is preferably operable to rotate the, or each, agitating member in the chamber, and, in one embodiment, the driving means includes a rotary shaft extending through the chamber (and driven for example by an electric motor), and the, or each, agitating member is provided by a vane on the shaft.

The, or each, vane is preferably inclined relative to the axis of the shaft so as to urge the dross, metal and oxide in the direction of the shaft. The vaned shaft therefore acts not only to break down the dross but also to feed the material through the chamber so that a continuous, or quasi-continuous, operation can be achieved.

The agitating members or vanes are, for reasons of constructional simplicity and high effectiveness, preferably arranged in groups spaced apart along the shaft, the vanes in each group being distributed around the shaft.

The axis of the shaft is preferably generally horizontal.

Also, the chamber is preferably provided by a tubular member, with the means to allow dross to be placed in the chamber and the means to allow metal and oxide to be removed from the chamber being provided by inlet and outlet openings in the tubular member spaced apart therealong. In the case where the vane or vanes are mounted on a shaft, its axis preferably extends longitudinally of the tubular member. When various of the above features are provided in a single apparatus, dross can simply be ladled into the inlet opening, whereupon it is broken down into metal and oxide by, and fed along the tubular member by, the rotating vaned shaft, so that metal and oxide comes out of the outlet opening.

The apparatus preferably further includes means for heating the tubular member, preferably also with thermostatic control.

The apparatus also preferably further includes a receptacle for receiving metal and oxide which has been removed from the chamber, and means for separating out an oxide layer from the metal on which the oxide floats in the receptacle. Preferably, the receptacle has a first compartment for receiving the metal and oxide, a second compartment, and a passageway between the two compartments and below the level of the oxide layer in the first compartment, so that the metal can flow from the first compartment to the second compartment. The second compartment preferably has a weir over which the metal can flow into a metal collection container, and the first compartment preferably has a weir over which oxide can pass into an oxide collection container. The apparatus preferably further includes a member which is drivable to urge the oxide towards the oxide weir, and/or a member which is drivable to cause vertical stirring between the oxide layer and the metal. It has been found that a screw rotatable about its axis can be employed to perform both of these functions. The apparatus preferably further includes means for introducing air bubbles into the metal in the receptacle, so that the air bubbles rising from the metal aerate the oxide layer on the metal. The aeration of the oxide makes it more fluid so that it can be more easily be moved toward the oxide weir, and also makes it less dense so that droplets of metal which may tend to float on the oxide layer can more easily penetrate the oxide layer so as to join the main body of molten metal beneath the oxide layer.

In accordance with a second aspect of the present invention, there is provided a method of recovering metal (for example solder) from dross (for example solder dross), the method comprising the steps of: placing the dross in a chamber, agitating the dross in the chamber so as to release the metal from the oxide of the dross, and removing the released metal and the oxide from the chamber. The dross is preferably agitated by being sliced, chopped, whipped, whisked and/or stirred, and more preferably by being sliced.

The dross is preferably placed in the chamber immediately after it has been removed from a solder bath and while the solder content of the dross is still molten.

The method preferably also includes any or all of the steps performed by the apparatus according to the first aspect of the invention.

DETAILED DESCRIPTION OF THE PREFERRED EMBODIMENTS

Figure 1:
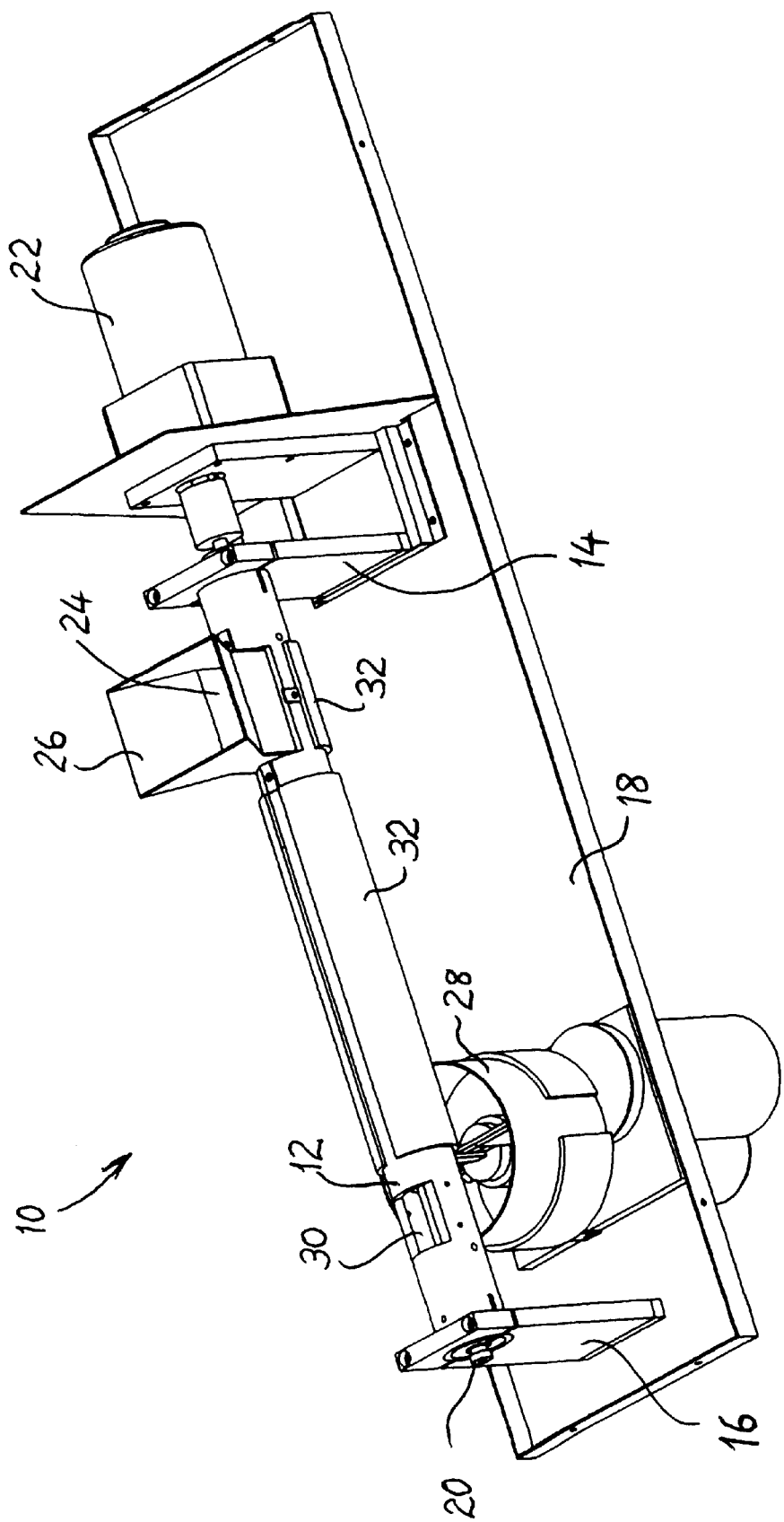
FIG. 1 is a perspective view of a solder dross processing machine.

Preferred embodiments of the invention will now be described, purely by way of example, with reference to the accompanying drawings, in which:

Referring to FIG. 1, a dross processing machine 10 comprises a circular cylindrical tubular member 12 which is mounted with its axis horizontal by mounting members 14,16 on a base 18. A horizontal shaft 20 extends through the tubular member 12 and is mounted on journals which close the opposite ends of the tubular member 12. One end of the shaft 20 is coupled to an electric motor and gearbox 22 which is also mounted on the base 18 and which, in use, serves to rotate the shaft 20.

Adjacent one end of the tubular member 12, an inlet opening 24 is formed in the upper surface of the tubular member 12, and a hopper 26 is mounted on the tubular member 12 to assist in the feeding of solder dross, by ladling, into the tubular member 12 through the inlet opening 24. Adjacent the other end of the tubular member 12, an outlet opening is formed in the lower surface of the tubular member 12, through which solder and oxide can drop into a separation receptacle 28 mounted on the base 18 beneath the outlet opening. An inspection opening 30 is formed in the upper surface of the tubular member above the outlet opening.

Electric heating elements 32 are mounted on the tubular member 12 between the inlet opening 24 and the outlet opening and also underneath the inlet opening 24. The heating elements are powered by a control circuit (not shown) and at least one temperature sensor (not shown) so as to maintain the temperature of the tubular member 12 above the melting point of the solder which is being processed but below the temperature at which the component metals of the solder de-alloy, for example at a temperature of about 220° C. in the case of 60:40 tin:lead solder.

Figure 2:
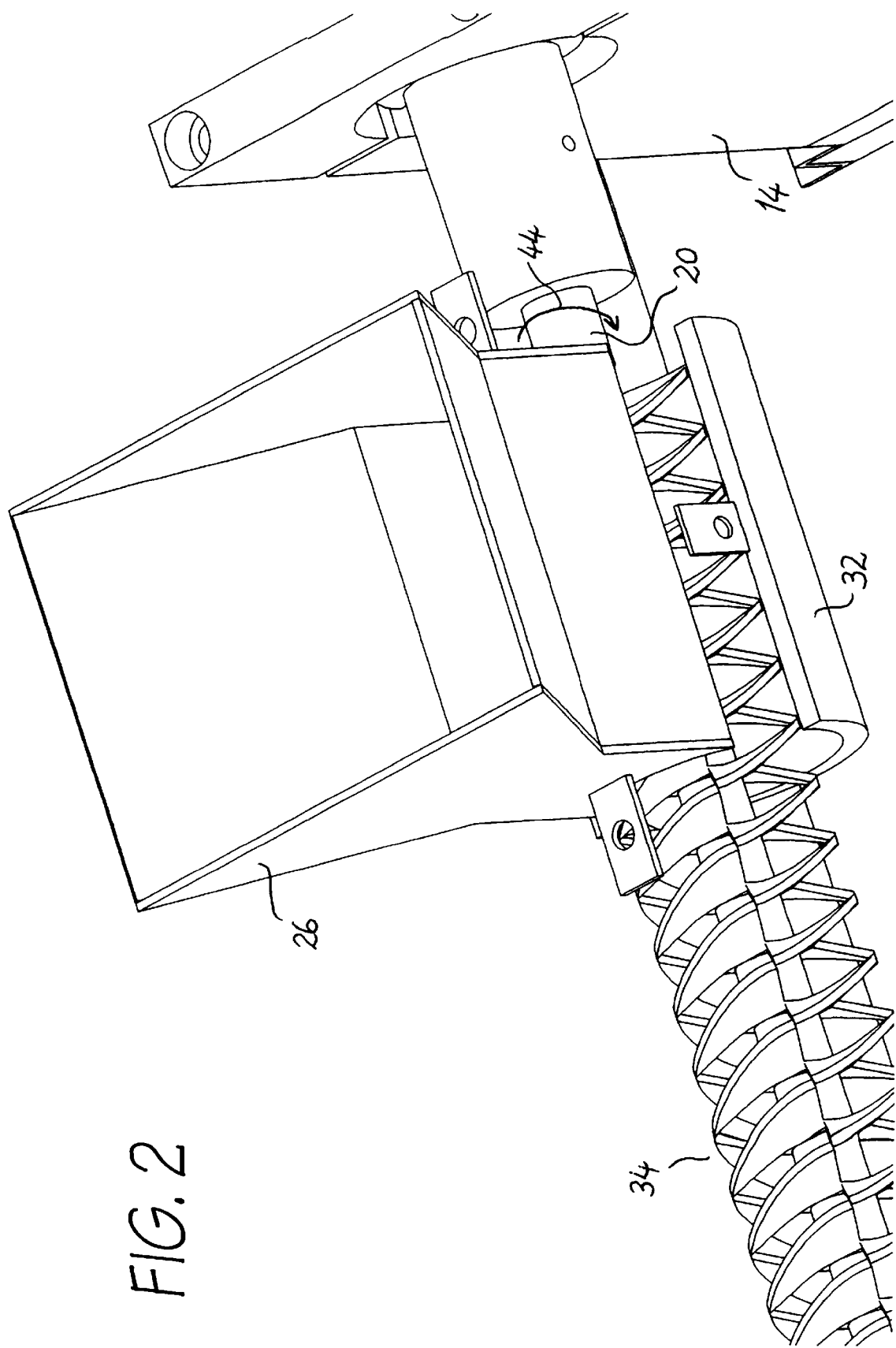
FIG. 2 is a perspective view of part of the machine with its tubular member removed.
Figure 3:
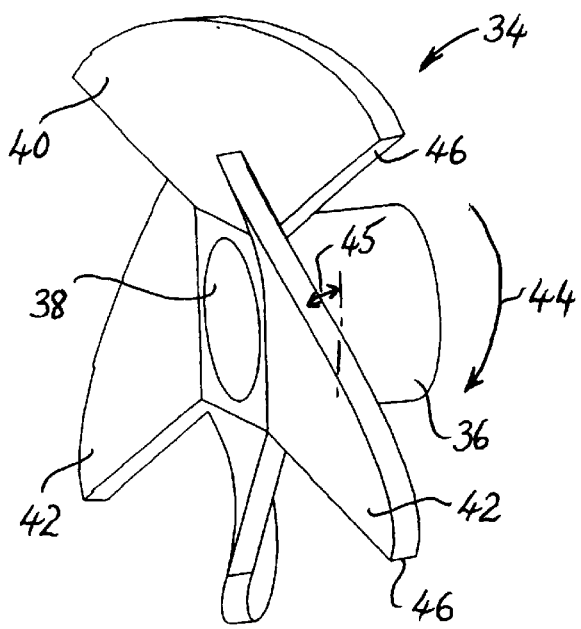
FIG. 3 is a perspective view of a slicing element used in the machine of FIG. 1.

Referring now to FIGS. 2 and 3, a series of slicing elements 34 is mounted along the shaft 20 inside the tubular member 12. Each slicing element 34 comprises a boss 36 having a through-hole 38 to receive the shaft 20 and a disc 40 mounted on the boss 36. The outside diameter of the disc 40 is slightly smaller than the inside diameter of the tubular member 12 so that the space between the peripheral edge of the disc 40 and the inner surface of the tubular member 12 is as small as possible but without the two touching during operation. A number of radial cuts, for example four, are made in the disc 40 so as to form a corresponding number of vanes 42, and each vane 42 is twisted through an angle referenced 45 about a radial axis so that each slicing element 34 has some resemblance to a ship's screw. The radial leading edge 46 of each vane is left square-cut, without being sharpened.

In operation, dross is ladled, as and when required, directly from a solder bath into the hopper 26 so that it falls through the inlet opening 24 into the tubular member 12. The shaft 20 and slicing elements 34 are rotated in the direction 44 so that the radial leading edge 46 of each vane 42 slices through any dross, solder or oxide which is resting on the bottom of the inside of the tubular member 12. This slicing action breaks down the sponge-like network of the oxide in the dross so as to release the solder from its encrustation by the oxide. Furthermore, the inclination of the vanes 42 causes the dross, solder and oxide to be urged along the tubular member 12 in the direction from the inlet opening 24 to the outlet opening, whereupon it falls through the outlet opening into the separation receptacle 28.

The size of the machine, the speed of rotation of the shaft 20, the number of vanes 40 per slicing element 34, the twist angle 45 of each vane 40 and the total number of slicing elements 34 are chosen so that, by the time the material reached the outlet opening, substantially all of the dross has been broken down into its constituent metal and oxide. A prototype has been constructed having an inside diameter of the tubular member of 38 mm, a spacing between the inlet opening 24 and outlet opening of 360 mm, four vanes 40 per slicing element 34, a vane twist angle of 20°, 30 slicing elements 34 in total and a speed of rotation of the shaft 20 of 250 r.p.m. In operation, no detectable dross remained in the material exhausted through the outlet opening. It will be appreciated that this prototype performed slicing actions on the material at a rate of 30,000 per minute (i.e. 4 vanes per element×30 elements×250 r.p.m.). It was noted during operation of the prototype that the time taken for material to travel from the inlet opening 24 to the outlet opening was approximately 4 seconds, and it will therefore be appreciated that the approximate number of slicing actions while each piece of material passed through the tubular member was 2,000 (i.e. 30,000 slicing actions per minute×4 seconds travel time/60).

Figure 4:
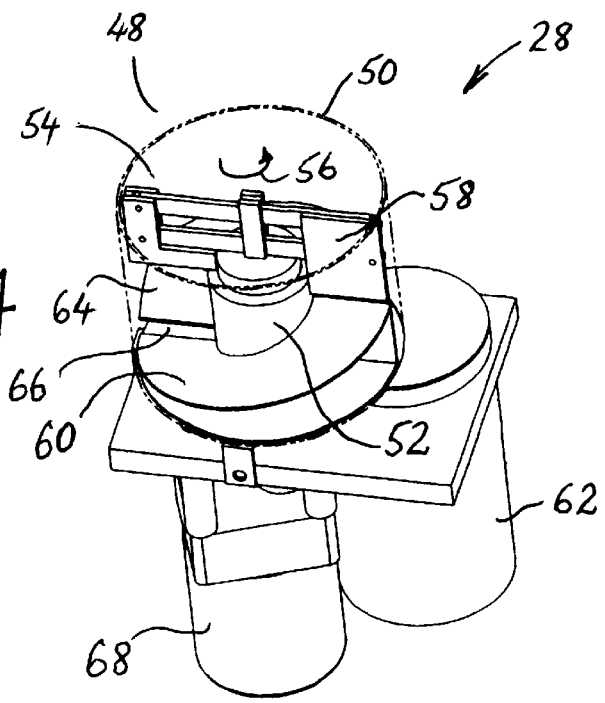
FIG. 4 is a perspective view of a part of the machine of FIG. 1 for separating the oxide and the metal.

Referring now to FIG. 4, the separation receptacle 28 comprises a bowl 48 having a circular cylindrical side wall 50 (shown in phantom line) and a base with a central upstanding boss 52. An electric motor and gearbox 68 mounted beneath the bowl 48 has a shaft which projects through the boss 52 and is coupled to a paddle mechanism 54 so as to rotate the paddle mechanism at a slow speed of, for example, 10 r.p.m., either continuously or intermittently, in the direction 56 about the vertical axis of the bowl 48. The paddle mechanism 54 mounts a paddle 58 so that the paddle 58 rotates around the boss 52 and so that the paddle 58 can be lifted vertically to a limited extent and so that it drops under its own weight.

The base of the bowl 48 includes a ramped portion 60 which is ramped upwardly in the direction 56 of rotation, and this is followed by an opening (not shown) in the base of the bowl 48 leading to a discharge chute 62 for oxide. This is followed, in the direction 56 of rotation, by a ledge 64 having an opening 66 underneath leading to a weir (not shown) over which solder can flow into a discharge chute (not shown) for solder. The level of the weir is slightly lower than the level of the upper edge of the ramped portion 60 of the base of the bowl 48.

A solder ingot tray (not shown) is placed beneath the solder discharge chute, and a collection bag of aluminium foil (not shown) is attached around the lower part of the oxide discharge chute 62.

The separation receptacle also has one or more electrical heaters, a control circuit and one or more temperature sensors (not shown) which operate to maintain the temperature of the bowl 48 at approximately the same temperature as described above for the tubular member 12.

In operation, the bowl 48 is initially charged with molten solder up to the level of the weir. As solder droplets and oxide particles are discharged from the outlet opening of the tubular member 12, they fall into the bowl. The oxide particles float on the solder in the bowl so as to form an oxide layer. The discharged solder droplets are able to penetrate through the oxide layer, provided that the oxide layer does not grow too thick. The solder droplets penetrating through the oxide layer increase the level of molten solder in the bowl 48, and periodically (due to surface tension effects) a quantity of the molten solder overflows the weir and drops through the solder discharge chute into the solder ingot tray. The lower edge of the ledge 64 is beneath the level of the solder so as to prevent the oxide passing to the weir.

In order to prevent the oxide layer growing too thick, the paddle 58 is operated. As the paddle 58 begins passing over the ramped portion 60 of the base of the bowl 48, its lower edge is slightly below the level of the molten solder, and it skims the oxide layer over the surface of the solder. The lower edge of the paddle 58 then engages and starts to ride up the ramped portion 60, pushing the oxide ahead of it up the ramped portion 60. Any small quantity of molten solder which has become entrained immediately ahead of the paddle 58 is allowed to escape back down the ramped portion 60 through a small gap between a side of the paddle 58 and the boss 52 and/or the side wall 50 of the bowl 48. As the paddle 58 continues, it pushes the oxide over the apex of the ramped portion, whereupon it falls through the oxide discharge chute 62 into the aluminium foil collection bag. The paddle 58 continues, dropping down over the ledge 64 and back to the position initially described above.

Once the solder ingot tray is full, it is replaced with an empty one, and the ingot of recovered solder can then be reused. Once the collection bag for the oxide is full, it is sealed, disposed of, and replaced by a fresh bag.

Figure 5:
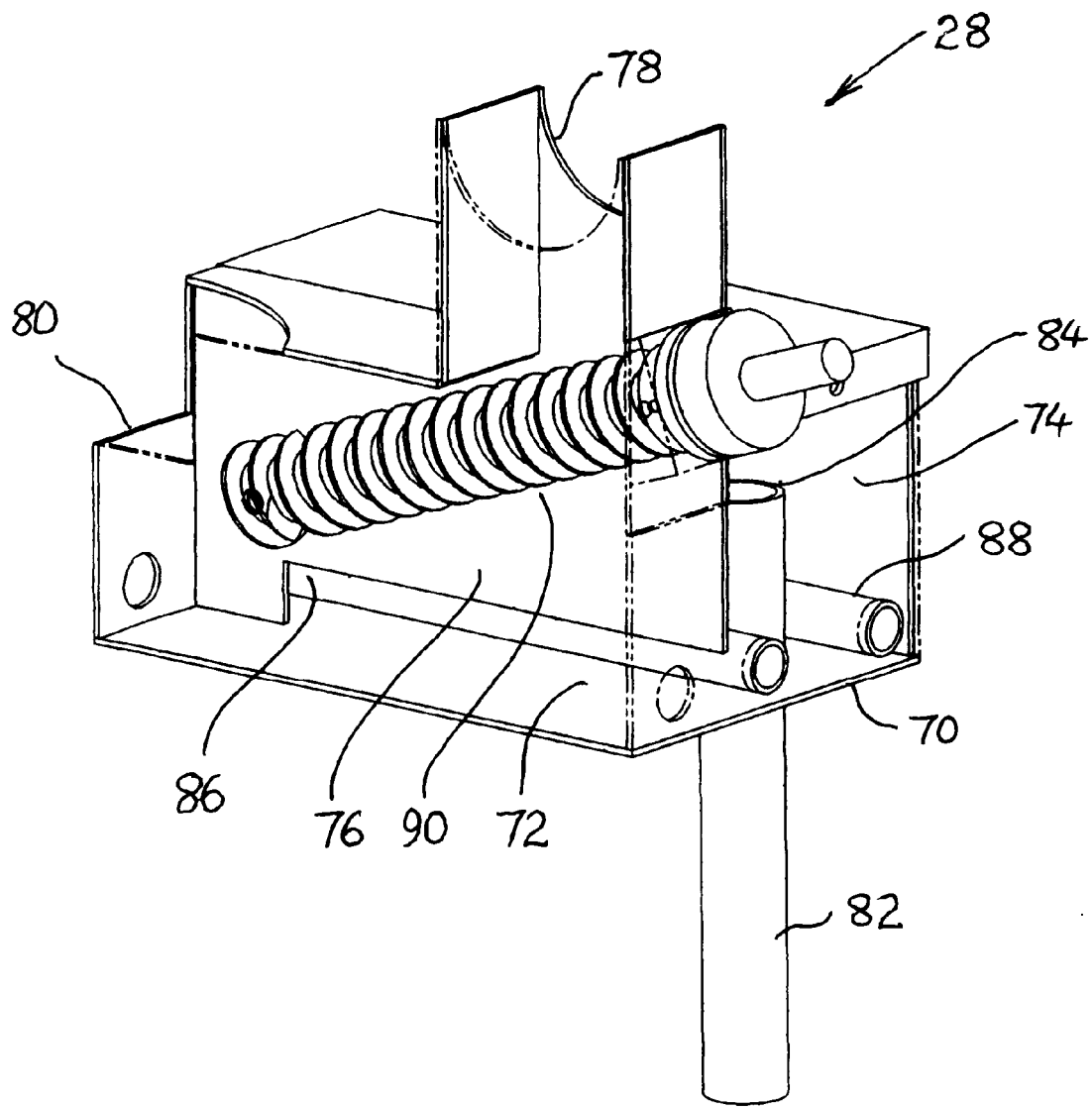
FIG. 5 is a perspective view of a modified part of the machine of FIG. 1 for separating the oxide and the metal.

A modified separation vessel 28 will now be described with reference to FIG. 5. The vessel 28 comprises a rectangular box 70 which in FIG. 5 is shown with its two nearer walls in phantom lines. The box is separated into two compartments 72,74 by a partition wall 76. The nearer compartment 72 (as viewed in FIG. 5) has an inlet chute 78 above it to receive solder and oxide from the outlet opening in the tubular member 12. At one corner of the nearer compartment 72, its walls are of reduced height to form an oxide weir 80. An oxide collection vessel or bag (not shown) is disposed below the nearer compartment 72 to collect oxide which passes over the oxide weir 80. A pipe 82 extends upwardly through the floor of the farther compartment 74. The upper end of the pipe forms a solder weir 84 and is at a level slightly below the level of the oxide weir 80. The lower end of the pipe 82 feeds to a solder ingot tray (not shown). A lower portion of the partition wall 76 is cut away to form an opening 86 between the two compartments 72,74. The upper edge of the opening 86 is well below the level of the solder weir 84. Electrical heating elements 88 are provided in the compartments 72,74 slightly above the floor level. An inclined screw 90 enters the nearer compartment 72 at a level well above the level of the oxide weir 80 and extends downwardly across the nearer compartment 72 to an end which is at least partly below the level of the solder weir 84, but which is above the upper edge of the opening 86 between the compartments 72,74. The inclined screw 90 extends beneath the inlet chute 78 and, in use, is driven by an electric motor (not shown) for rotation about the screw axis.

In operation of the modified separation vessel 28 of FIG. 5: the compartments 72,74 contain solder up to the level of the solder weir 84; the solder is maintained in a molten state by the heating elements 88; and the screw 90 is rotated. As solder droplets and oxide are discharged from the outlet opening of the tubular member 12, they drop into the nearer compartment 72. The increase in the amount of solder and oxide in the nearer compartment 72 causes material to flow through the opening 86 between the two compartments 72,74 to increase the level of material in the farther compartment 74, and material therefore overflows the solder weir 84 (albeit intermittently due to surface tension effects) into the pipe 82 whence it drops into the solder ingot tray. The increase in the amount of solder and oxide in the nearer compartment 72 also causes material to overflow the oxide weir 80 (albeit intermittently) and be deposited into the oxide collection vessel or bag.

As mentioned above in the description of FIG. 4, oxide tends to float on molten solder, and falling solder droplets are able to penetrate the oxide layer provided that the oxide layer is not too thick. In the modified separation vessel 28 of FIG. 5, the upper edge of the opening 86 between the two compartments 72,74 is below the level of the oxide layer, and therefore is only solder that flows through the opening 86 and overflows the solder weir 84 into the solder ingot tray. Without the provision of the inclined screw 90, the thickness of the oxide layer in the nearer compartment 72 might build up so that solder droplets would not penetrate the oxide layer. However, the inclined screw 90 has two effects as it rotates. First, it pushes the oxide layer towards the oxide weir 80 and away from the region beneath the outlet opening of the tubular member 12 so as to assist solder droplets falling from the outlet opening to penetrate the oxide layer. Second, it produces a vertical stirring action between the oxide layer and the solder, and it has been found that with this stirring action any solder droplets which are floating on the oxide layer drop through the oxide layer to join the main body of molten solder below the oxide layer. As a result, the material which overflows the oxide weir is substantially completely oxide, with hardly any trace of solder in it.

In a further development to the separation vessel 28 of FIG. 5 (or FIG. 4), one or more pipes lead into the inner compartment 72 within the body of the molten solder. The ends of the pipes in the compartment 72 are closed, but the walls of the pipes in the compartment 72 are formed with a number of small holes. The other ends of the pipes are connected to an air compressor. In operation, bubbles of air rise from the holes through the solder and through the oxide layer. The aeration of the oxide layer makes it more fluid so that it can be more easily be moved by the screw 90 toward the oxide weir 80, and also makes it less dense so that droplets of solder which may tend to float on the oxide layer can more easily penetrate the oxide layer so as to join the main body of molten solder beneath the oxide layer. The air flow rate and/or pressure is set so that it is great enough to have the above effect, but not so great that it causes the solder to be blown about too much so that it spills over the oxide weir 80.

It will be appreciated that many other modifications and developments may be made to the embodiment of the invention described above. The above embodiment uses the leading edges 46 of the steadily rotating vanes 42 to perform a slicing action through the dross. In an alternative embodiment, the direction of rotation of the vanes 42 could be reversed periodically so as possibly to cause more agitation of the dross, and the period of driving in one direction could be made unequal to the period of driving in the opposite direction so that the dross, metal and oxide are still caused to travel overall from the inlet opening 24 to the outlet opening. Also, the vanes 42, or agitating members, could be moved in a different fashion, for example with a reciprocating movement so as to perform a chopping action on the dross. Other forms of agitation are also envisaged, such as a whipping, whisking or stirring action, but still having the effect of causing pieces of dross to collide with an agitating member or with each other so as to break down the sponge-like network of the oxide in the dross and thus release the metal therefrom.

It should be noted that the embodiment of the invention and modifications thereto have been described above purely by way of example and that many other modifications and developments may be made thereto within the scope of the present invention.

What we claim is:

1. An apparatus for recovering metal from metal/oxide dross the apparatus comprising: a chamber, means to allow dross to be placed in the chamber, an agitating member mounted in the chamber, means for driving the agitating member so that it agitates the dross in the chamber so as to release the metal from the oxide of the dross, means to allow the released metal and the oxide to be removed from the chamber, a receptacle for receiving metal and oxide which has been removed from the chamber, and means for separating out an oxide layer from the metal on which the oxide floats in the receptacle.

2. An apparatus as claimed in claim 1, wherein the receptacle has a first compartment for receiving the metal and oxide, a second compartment, and a passageway between the two compartments and below the level of the oxide layer in the first compartment, so that the metal can flow from the first compartment to the second compartment.

3. An apparatus as claimed in claim 2, wherein the second compartment has a weir over which the metal can flow into a metal collection container.

4. An apparatus as claimed in claim 2, wherein the first compartment has a weir over which oxide can pass into an oxide collection container.

5. An apparatus as claimed in claim 4, further including a member which is drivable to urge the oxide towards the oxide weir.

6. An apparatus as claimed in claim 1, further including a member which is drivable to cause vertical stirring between the oxide layer and the metal.

7. An apparatus as claimed in claim 5, further including a member which is drivable to cause vertical stirring between the oxide layer and the metal, the urging member and the stirring member both being provided by a screw rotatable about its axis.

8. An apparatus as claimed in claim 1, further including means for introducing air bubbles into the metal in the receptacle, so that the air bubbles rising from the metal aerate the oxide layer on the metal.

9. An apparatus for recovering metal from metal/oxide dross, the apparatus comprising: a tubular member having a generally horizontal axis, the tubular member having an inlet opening for receiving dross and an outlet opening spaced apart from the inlet opening along the tubular member; a rotary shaft extending along the tubular member and having a generally horizontal axis; means for rotating the shaft in a predetermined direction; and a plurality of vanes mounted on the shaft for agitating dross received through the inlet opening as the shaft is rotated to release the metal from the oxide of the dross the vanes being inclined relative to the axis of the shaft so as to urge the dross, metal and oxide along the tubular member towards the outlet opening as the shaft is rotated in said predetermined direction so that the metal and oxide exits the tubular member through the outlet opening.

10. An apparatus as claimed in claim 9, further including a receptacle for receiving metal and oxide which has been removed from the chamber, and means for separating out an oxide layer from the metal on which the oxide floats in the receptacle.

11. An apparatus as claimed in claim 9 wherein the vanes are arranged in groups spaced apart along the shaft, the vanes in each group being distributed around the shaft.

12. An apparatus as claimed in claim 9, further including means for heating the tubular member.

* * * * *